(12) United States Patent
Lee et al.

(10) Patent No.: US 11,106,187 B2
(45) Date of Patent: Aug. 31, 2021

(54) FLEXIBLE ASSEMBLY SYSTEM FOR VARIABLE RECONFIGURATION, AND METHOD OF RECONFIGURING PRODUCTION LINE

(71) Applicant: ELECTRONICS AND TELECOMMUNICATIONS RESEARCH INSTITUTE, Daejeon (KR)

(72) Inventors: Hark Jin Lee, Daejeon (KR); Hyun Jong Kim, Cheongju-si (KR); Ji Yeon Son, Daejeon (KR); Yong Kwi Lee, Daejeon (KR); Young Ae Jeon, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 112 days.

(21) Appl. No.: 16/541,213

(22) Filed: Aug. 15, 2019

(65) Prior Publication Data

US 2020/0209817 A1    Jul. 2, 2020

(30) Foreign Application Priority Data

Dec. 28, 2018 (KR) .......................... 10-2018-0172266

(51) Int. Cl.
*G05B 19/042* (2006.01)
*H04L 29/08* (2006.01)

(52) U.S. Cl.
CPC ............ *G05B 19/042* (2013.01); *H04L 67/12* (2013.01); *G05B 2219/2629* (2013.01)

(58) Field of Classification Search
CPC .......... G05B 19/042; G05B 2219/2629; H04L 67/12
See application file for complete search history.

(56) References Cited

U.S. PATENT DOCUMENTS 6,349,237 B1 * 2/2002 Koren .................... B23Q 37/00
                                                                700/96
2006/0276921 A1 * 12/2006 Verstraeten ...... G05B 19/41845
                                                                700/95

(Continued)

FOREIGN PATENT DOCUMENTS

| KR | 10-1057614 B1 | 8/2011 |
| KR | 10-1853792 B1 | 5/2018 |
| KR | 10-2018-0118474 A | 10/2018 |

*Primary Examiner* — Gary Collins
(74) *Attorney, Agent, or Firm* — LRK Patent Law Firm

(57) ABSTRACT

A flexible assembly system for variable reconfiguration, and a method of reconfiguring a production line. The method includes receiving line configuration information based on a reconfigured production line, retrieving process terminals required to be included in the reconfigured production line based on the line configuration information, when at least one among the process terminals required to be included in the reconfigured production line is not retrieved, transmitting information about the process terminal not retrieved to a line installer terminal, when all the process terminals required to be included in the reconfigured production line are retrieved, dividing the line configuration information based on each of the retrieved process terminals, and transmitting the divided line configuration information to each of the retrieved process terminals and verifying whether a component is provided in each of the process terminals.

13 Claims, 9 Drawing Sheets

(56) References Cited

U.S. PATENT DOCUMENTS

| | | |
|---|---|---|
| 2009/0089150 A1 | 4/2009 | Lee et al. |
| 2015/0134097 A1* | 5/2015 | Maenishi ............ H05K 13/086 700/99 |
| 2016/0187850 A1 | 6/2016 | Oh |
| 2016/0274569 A1* | 9/2016 | Peng ................ G05B 19/41845 |
| 2018/0182653 A1 | 6/2018 | Chong et al. |
| 2018/0307215 A1* | 10/2018 | Kim ................ G05B 19/41805 |

* cited by examiner

FLEXIBLE ASSEMBLY SYSTEM FOR VARIABLE RECONFIGURATION, AND METHOD OF RECONFIGURING PRODUCTION LINE

CROSS-REFERENCE TO RELATED APPLICATION(S)

This application claims the priority benefit of Korean Patent Application No. 10-2018-0172266, filed on Dec. 28, 2018, in the Korean Intellectual Property Office, the disclosure of which is incorporated herein by reference for all purposes.

BACKGROUND

1. Field

One or more example embodiments relate to a flexible assembly system capable of variable reconfiguration that reconfigures a production line, and a method of reconfiguring a production line.

2. Description of Related Art

There have been introduced various methods of reconfiguring or reconstructing a production line to produce various products. For example, existing production systems adopting an Internet of things (IoT) concept may not discover a process terminal omitted in a process of reconfiguring a production line, and an issue may thus occur therefrom.

In addition, since the existing production systems adopting the IoT concept do not reveal interfaces for installations included in an existing production line, it may not readily reuse an existing installation to reconfigure the production line. Further, since the existing production systems do not include a structure that interworks with a new installation, it may not readily interwork the new installation with an existing installation when the existing installation included in the production line is replaced with the new installation.

Thus, there is a desire for a method of reusing components in a process of reconfiguring a production line.

SUMMARY

An aspect provides a system and method that prevents a process terminal which is required to be included in a reconfigured production line from being omitted in a process of reconstructing the production line.

Another aspect provides an apparatus and method that identifies a component to be used in a reconfigured production line from among components provided in a process terminal and reuses the identified component.

According to an example embodiment, there is provided a method of reconfiguring a production line to be performed by a line management server, the method including receiving line configuration information based on a reconfigured production line, retrieving process terminals required to be included in the reconfigured production line based on the line configuration information, when at least one among the process terminals required to be included in the reconfigured production line is not retrieved, transmitting information about the process terminal not retrieved to a line installer terminal, when all the process terminals required to be included in the reconfigured production line are retrieved, dividing the line configuration information based on each of the retrieved process terminals, and transmitting the divided line configuration information to each of the retrieved process terminals and verifying whether a component is provided in each of the process terminals.

The line configuration information may be generated in a line configuration device and transmitted first to the line installer terminal. A response that reconfiguration of the production line is completed based on the line configuration information is received from the line installer terminal, the line configuration information may be transmitted to the line management server.

The verifying may include transmitting the divided line configuration information to each of the retrieved process terminals, receiving, from the process terminals, a retrieval result of retrieving components provided in the process terminals based on component identification information included in the divided line configuration information, and transmitting the retrieval result to the line installer terminal.

The transmitting of the retrieval result to the line installer terminal may include, when the retrieval result indicating that at least one component is not retrieved is received, transmitting identification information of the component not retrieved to the line installer terminal, and when the retrieval result indicating that all components are retrieved is received, transmitting information about a process terminal in which all components are provided to the line installer terminal.

The method may further include, when components are provided in all the process terminals, sending a request to the process terminals to perform a production process.

According to another example embodiment, there is provided a method of reconfiguring a production line to be performed by a process terminal, the method including receiving a component list including component identification information of components required to be connected to the process terminal, retrieving a component reusable for a reconfigured production line among components provided in the process terminal based on the component identification information included in the component list, when there is a component not retrieved among the components included in the component list, transmitting identification information of the component not retrieved to a line management server, and when all the components included in the component list are retrieved, transmitting a retrieval result indicating that all the components are retrieved to the line management server. The line management server may send a request to a line installer terminal to connect the component not retrieved to the process terminal.

The receiving of the component list may include further receiving a component configuration description based on serial communication or a characteristic of a component. The retrieving of the component may include retrieving the component using the component configuration description.

According to still another example embodiment, there is provided a flexible assembly system capable of variable reconfiguration, the flexible assembly system including a line management server configured to retrieve process terminals required to be included in a reconfigured production line based on line configuration information of the reconfigured production line, divide the line configuration information based on the retrieved process terminals, and transmit the divided line configuration information to each of the retrieved process terminals, and a process terminal configured to retrieve a component reusable for the reconfigured production line among components provided in the process terminal based on component identification information included in the divided line configuration information, and transmit a retrieval result of the retrieving to the line management server.

When at least one process terminal is not retrieved among the process terminals to be included in the reconfigured production line, the line management server may transmit information about the process terminal not retrieved to a line installer terminal. When all the process terminals to be included in the reconfigured production line are retrieved, the line management server may divide the line configuration information based on each of the retrieved process terminals.

The line configuration information may be generated in a line configuration device and transmitted first to the line installer terminal. When a response that reconfiguration of a production line is completed based on the line configuration information is received from the line installer terminal, the line configuration information may be transmitted to the line management server.

When a retrieval result indicating that at least one component is not retrieved is received from the process terminal, the line management server may transmit identification information of the component not retrieved to the line installer terminal. When a retrieval result indicating all components are retrieved is received from the process terminal, the line management server may transmit information about the process terminal in which all the components are provided to the line installer terminal.

When components are provided in all process terminals, the line management server may send a request to the process terminals to perform a production process.

When there is a component not retrieved among components included in a component list in the line configuration information, the process terminal may transmit identification information of the component not retrieved to the line management server. When all components included in the component list are retrieved, the process terminal may transmit a retrieval result indicating that all the components are retrieved to the line management server.

According to yet another example embodiment, there is provided a flexible assembly system capable of variable reconfiguration, the flexible assembly system including a line management server configured to retrieve process terminals required to be included in a reconfigured production line based on line configuration information of the reconfigured production line, when at least one process terminal is not retrieved among the process terminals to be included in the reconfigured production line, transmit information about the process terminal not retrieved to a line installer terminal, when all the process terminals to be included in the reconfigured production line are retrieved, divide the line configuration information based on the retrieved process terminals, and transmit the divided line configuration information to each of the retrieved process terminals and verify whether a component is provided in each of the process terminals.

The line management server may transmit the divided line configuration information to each of the retrieved process terminals, receive a retrieval result of retrieving components provided in the process terminals based on component identification information included in the divided line configuration information, and transmit the retrieval result to the line installer terminal.

When a retrieval result indicating that at least one component is not retrieved is received, the line management server may transmit identification information of the component not retrieved to the line installer terminal. When a retrieval result indicating all components are retrieved is received from the process terminal, the line management server may transmit information about the process terminal in which all the components are provided to the line installer terminal. When all components included in the component list are retrieved, the process terminal may transmit a retrieval result indicating that all the components are retrieved to the line management server.

The line management server may send a request to a line installer terminal to connect the component not retrieved to the process terminal.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
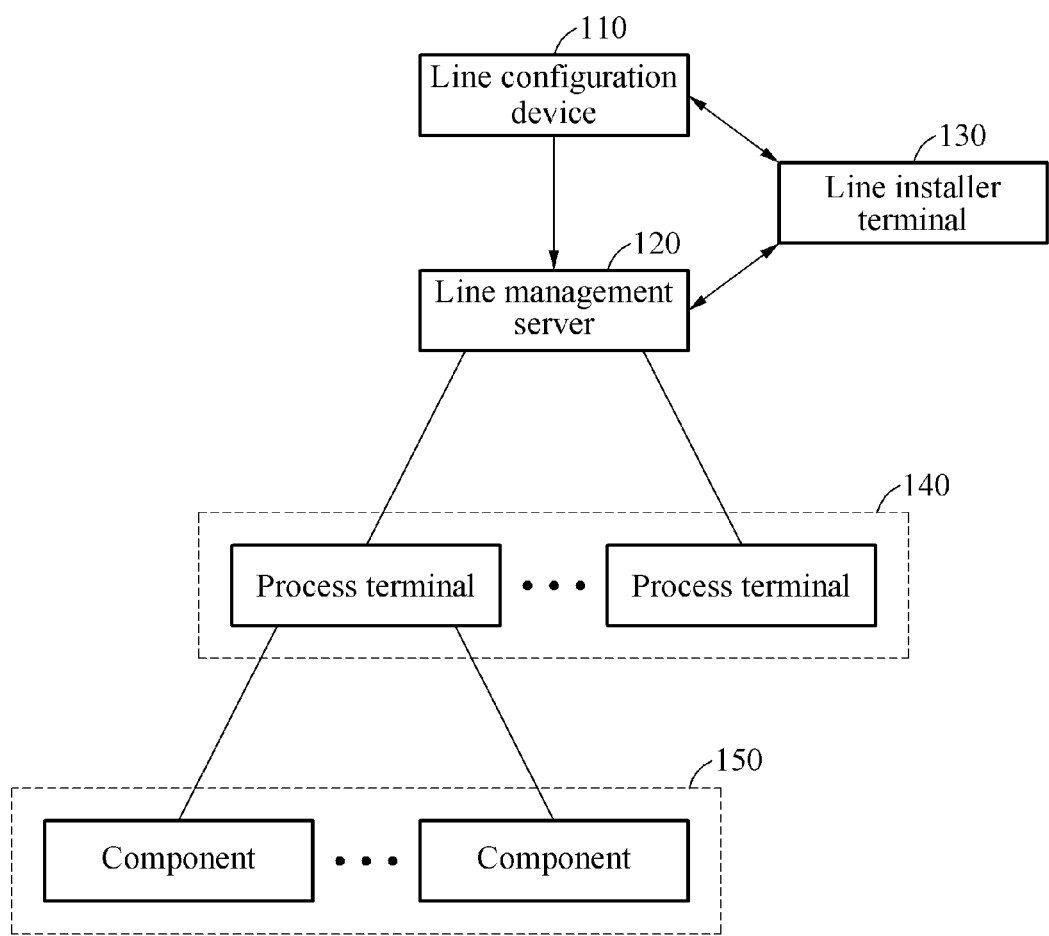
FIG. 1 is a diagram illustrating an example of a flexible assembly system for variable reconfiguration according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, example embodiments will be described in detail with reference to the accompanying drawings. Regarding the reference numerals assigned to the elements in the drawings, it should be noted that the same elements will be designated by the same reference numerals, wherever possible, even though they are shown in different drawings.

According to the example embodiments described herein, a method of reconfiguring a production line, hereinafter simply a production line reconfiguring method, may be performed by a flexible assembly system capable of variable reconfiguration.

FIG. 1 is a diagram illustrating an example of a flexible assembly system for variable reconfiguration according to an example embodiment.

Referring to FIG. 1, a flexible assembly system for variable reconfiguration includes a line configuration device 110, a line management server 120, a line installer terminal 130, and a plurality of process terminals 140.

The line configuration device 110 may configure or construct a production line or process line, and reconfigure or reconstruct a previously configured production line or process line. The terms "configure" and "reconfigure" may be used interchangeably with the terms "construct" and "reconstruct," respectively. In addition, the term "production line" may be used interchangeably with the term "process line." The line configuration device 110 may be a processor configured to perform a process/line configuration tool, or a terminal including the processor. In addition, the line configuration device 110 may generate line configuration information based on the reconfigured production line or process line. The line configuration information may include at least one of a list of the process terminals 140 included in the reconfigured production line, an arrangement order of the process terminals 140, or a component list including component identification information of components 150 required to be connected to each of the process terminals 140. The line configuration device 110 may generate the line configuration information as in the following code, for example.

[Code]

```
{
  "PA": {
    "PAName": "",
    "PAURI": "http://192.168.4.86:8081",
    "MESURI": "http://125.141.35.218:8081",
    "MESPOP": "",
    "LineID": "1",
    "LineName": "ASDF",
    "ModelInfo": "",
    "ModelSubInfo": "",
    "RAMCount": 3,
    "RAMList": [
      {
        "RAMID": "1",
        "RAMName": "SHINAL005M1",
        "Sequence": 1,
        "ComponentCount": 3,
        "ComponentList": [
          {
            "ComponentID": "1",
            "ComponentName": "Barcode Printer",
            "ComponentType":"BarcodePrinterType",
            "InterfaceType": "Serial",
            "COMPortName":
            "BaudRate": 0,
            "DataBits": 0,
            "StopBits": 0,
            "Parity": 0
          },
          {
            "ComponentID": "2",
            "ComponentName": "12fa9vdf",
            "ComponentType":"RDisplayType",
            "InterfaceType": "Ethernet",
            "IP": "",
            "Port": 0
          },
          {
            "ComponentID": "5",
            "ComponentName": "ReFACS Tag Module",
            "ComponentType":"RSENType",
            "InterfaceType": "Ethernet",
            "IP": "",
            "Port": 0
            "FTPURL": "ftp://URL.co.kr:8888/100/",
            "FileList": [
              "libReFACSComponent.lib",
              "libReFACSComponent_static_info.json",
              "ReFACS_RSEN.conf",
              "ReFACS_RSEN.exe",
            ]
```

```
                    }
                ]
            },
            {
                "RAMID": "2",
                "RAMName": "SHINAL005M2",
                "Sequence": 2,
                "ComponentCount": 3,
                "ComponentList": [
                    {
                        "ComponentID": "1",
                        "ComponentName": "Barcode Scanner",
                        "ComponentType":"BarcodeScannerType",
                        "InterfaceType": "Serial",
                        "COMPortName": "",
                        "BaudRate": 0,
                        "DataBits": 0,
                        "StopBits": 0,
                        "Parity": 0
                    },
                    {
                        "ComponentID": "2",
                        "ComponentName": "12fa9vdf",
                        "ComponentType":"RDisplayType",
                        "InterfaceType": "Ethernet",
                        "IP": "",
                        "Port": 0
                    },
                    {
                        "ComponentID": "3",
                        "ComponentName": "Electric Screw",
                        "ComponentType":"ElectricScrewType",
                        "InterfaceType": "Serial",
                        "COMPortName": "",
                        "BaudRate": 0,
                        "DataBits": 0,
                        "StopBits": 0,
                        "Parity": 0
                    }
                ]
            },
            {
                "RAMID": "3",
                "RAMName": "SHINAL005M3",
                "Sequence" : 3,
                "ComponentCount": 2,
                "ComponentList": [
                    {
                        "ComponentID": "1",
                        "ComponentName": "ReFACS Tag Module",
                        "ComponentType":"RSENType",
                        "InterfaceType": "Ethernet",
                        "IP": "",
                        "Port": 0
                    },
                    {
                        "ComponentID": "2",
                        "ComponentName": "12fa9vdf",
                        "ComponentType":"RDisplayType",
                        "InterfaceType": "Ethernet",
                        "IP": "",
                        "Port": 0
                    }
                ]
            }
        ]
```

The line configuration device 110 may transmit the generated line configuration information to the line management server 120 and the line installer terminal 130. For example, the line configuration device 110 may transmit the line configuration information first to the line installer terminal 130. In this example, the line installer terminal 130 may display the line configuration information to show it to a line installer which installs the production line, such that the line installer may reconfigure the production line.

In addition, the line installer terminal 130 may receive, from the line installer which reconfigures the production line, information indicating that the reconfiguration of the production line is completed based on the line configuration information. The line installer terminal 130 may transmit, to the line configuration device 110, a message indicating that the reconfiguration of the production line is completed. When the line configuration device 110 receives the message indicating that the reconfiguration of the production line is completed, the line configuration device 110 may transmit the line configuration information to the line management server 120 such that the line management server 120 may verify or manage the reconfiguration of the production line.

The line management server 120 may retrieve the process terminals 140 required to be included in the reconfigured production line based on the line configuration information received from the line configuration device 110.

When at least one among the process terminals 140 to be included in the reconfigured production line is not retrieved, the line management server 120 may transmit, to the line installer terminal 130, information about the process terminal not retrieved and a message indicating that the process terminal not retrieved is not reconfigured. The line installer terminal 130 may then display the information about the process terminal not retrieved to show the line installer the information, such that the installer may inspect the process terminal not retrieved.

When all the process terminals 140 to be included in the reconfigured production line are retrieved, the line management server 120 may divide the line configuration information based on each of the retrieved process terminals 140. The line configuration information may include the component list including the component identification information of the components to be connected to each of the process terminals 140, and thus the line management server 120 may extract the component list from the line configuration information, and divide the line configuration information into pieces of line configuration information respectively corresponding to the retrieved process terminals 140.

In addition, the line management server 120 may transmit, to each of the retrieved process terminals 140, the divided line configuration information to verify whether each of the process terminals 140 is provided with the components 150.

A process terminal among the process terminals 140 may retrieve the components 150 provided in the process terminal based on the component identification information included in the divided line configuration information. Herein, the retrieved components 150 may be components that are to be reused in the reconfigured production line among the components 150 provided with the process terminal. A component described herein may be attachable to or detachable from a process terminal.

When at least one component among the components 150 included in the component list is not retrieved, the process terminal may transmit, to the line management server 120, identification information of the component not retrieved and a retrieval result including a message indicating that the component is not retrieved among the components 150 included in the component list. In contrast, when all the components 150 included in the component list are retrieved, the process terminal may transmit, to the line management server 120, a retrieval result indicating that all the components 150 are retrieved. Herein, that all the components 150 included in the component list are retrieved may indicate that components 150 previously provided in the process terminal are all reusable for the reconfigured production line.

When the retrieval result indicating that the at least one component is not retrieved is received, the line management server 120 may transmit, to the line installer terminal 130, the identification information of the component not retrieved such that the line installer may connect the component corresponding to the transmitted identification information to the process terminal.

In contrast, when the retrieval result indicating that all the components are retrieved, the line management server 120 may transmit, to the line installer terminal 130, information about the process terminal in which all the components 150 are provided.

The line installer terminal 130 may compare the information about the process terminal received from the line management server 120 to the list of all the process terminals 140 to be included in the reconfigured production line, and verify whether providing or installing the components in all the process terminals 140 to be included in the reconfigured production line is completed. When all the components are provided in all the process terminals 140 to be included in the reconfigured production line, the line installer terminal 130 may transmit, to the line management server 120, a message indicating that installing the reconfigured production line is completed. In addition, the line management server 120 may send a request to the process terminals 140 to perform a production process such that the reconfigured production line may operate.

According to an example embodiment, a flexible assembly system for variable reconfiguration may retrieve a process terminal to be included in a reconfigured production line, and transmit information about a process terminal not retrieved to a line installer terminal, thereby preventing a process terminal from being omitted from a process of reconfiguring a production line.

According to an example embodiment, a flexible assembly system for variable reconfiguration may transmit a component list of components required to be connected to a process terminal, and the process terminal may verify whether the components to be used in a reconfigured production line are provided using the received component list. Thus, it is possible to identify and reuse components reusable in the reconfigured production line among the components provided in the process terminal.

Figure 2:
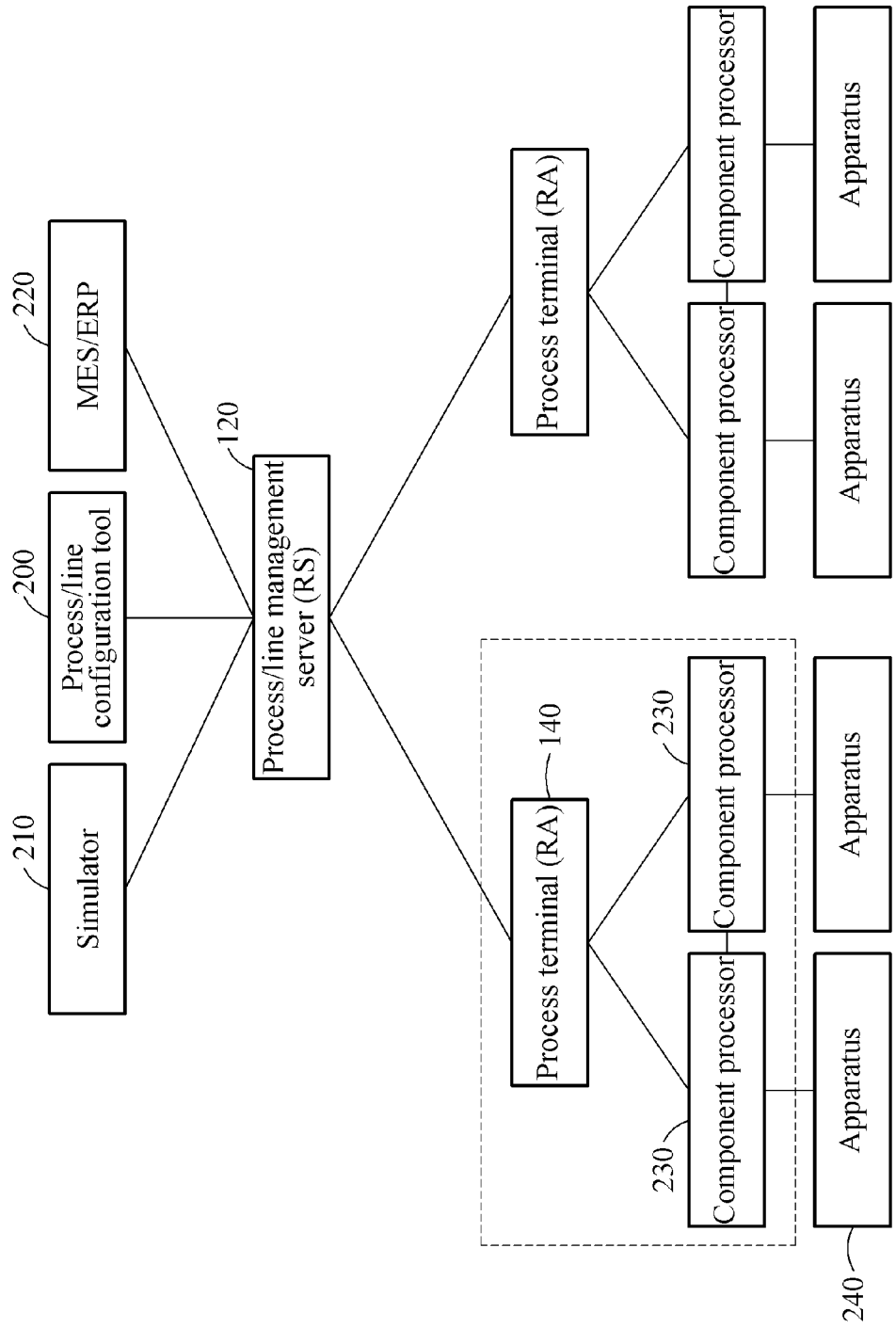
FIG. 2 is a diagram illustrating an example of a flexible assembly system for variable reconfiguration according to an example embodiment.

FIG. 2 is a diagram illustrating an example of a flexible assembly system for variable reconfiguration according to an example embodiment.

Referring to FIG. 2, a flexible assembly system for variable reconfiguration further includes a simulator 210, a manufacturing execution system (MES)/enterprise resource planning (ERP) server 220, and a component processor 230.

The simulator 210 may simulate a production line or process line that is reconfigured by the line configuration device 110 using a process line configuration tool 200.

The MES/ERP server 220 may perform ERP to integrate, plan, and manage all management resources (e.g., human resources, financial resources, and information) in all parts of an enterprise (e.g., production, sales, material control, personnel, and accounting), and perform MES which is a shopfloor system focusing on real-time environmental monitoring, control, distribution, work history tracking, state monitoring, and fault management.

In addition, the simulator 210 and the MES/ERP server 220 may be configured by hardware separate from the line configuration device 110, or by software included in the line configuration device 110. Here, the line configuration device 110 may include the simulator 210, the production line configuration tool 200, and the MES/ERP server 220 as illustrated in FIG. 2.

The component processor 230 may be a module or processor that is connected to an apparatus 240 to be attached to or detached from a process terminal, and configured to load information of the apparatus 240. The component processor 230 may process the loaded information of the apparatus 240 to correspond to a ReFACS schema, and transmit it to the process terminal. In addition, the component processor 230 may transmit the information of the apparatus 240 processed to correspond to the ReFACS schema to another component processor such that apparatuses are compatible with one another.

In addition, the component processor 230 may control the apparatus 240 by receiving a control message from an upper process processor or scheduler, or the process terminal. A component illustrated in FIG. 1 may be the apparatus 240 to which the component processor 230 is connected as illustrated in FIG. 2, and an operation of the component may be performed in the component processor 230 connected to the apparatus 240.

Figure 3:
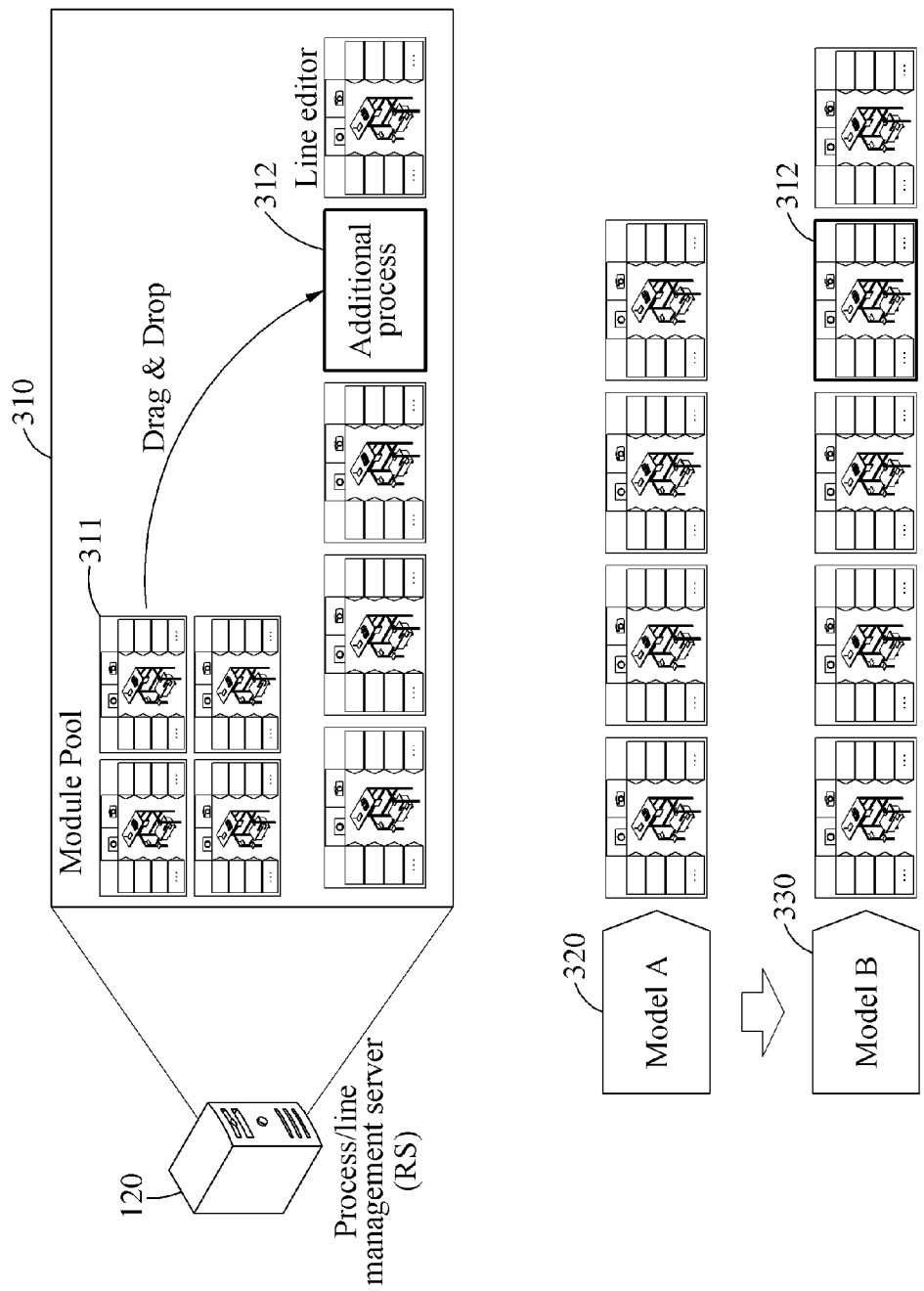
FIG. 3 is a diagram illustrating an example of a process of reconfiguring a line according to an example embodiment.

FIG. 3 is a diagram illustrating an example of a process of reconfiguring a line according to an example embodiment.

Referring to FIG. 3, a process line configuration tool of the line configuration device 110 includes an interface 310 to select a process terminal and a module 311 of components provided in each of the process terminals 140 and generate a corresponding process.

When a production line manager sends a request to the line configuration device 110 to select one from modules and add the selected module 311 as an additional process 312 to an existing production line, the line configuration device 110 may change line configuration information 320 based on the existing production line to line configuration information 330 reconfigured based on the request, and transmit the line configuration information 330 to the line management server 120. As illustrated in FIG. 3, the line configuration information 330 may be obtained by adding the module 311 as the additional process 312 to the line configuration information 320 based on the existing production line.

Figure 4:
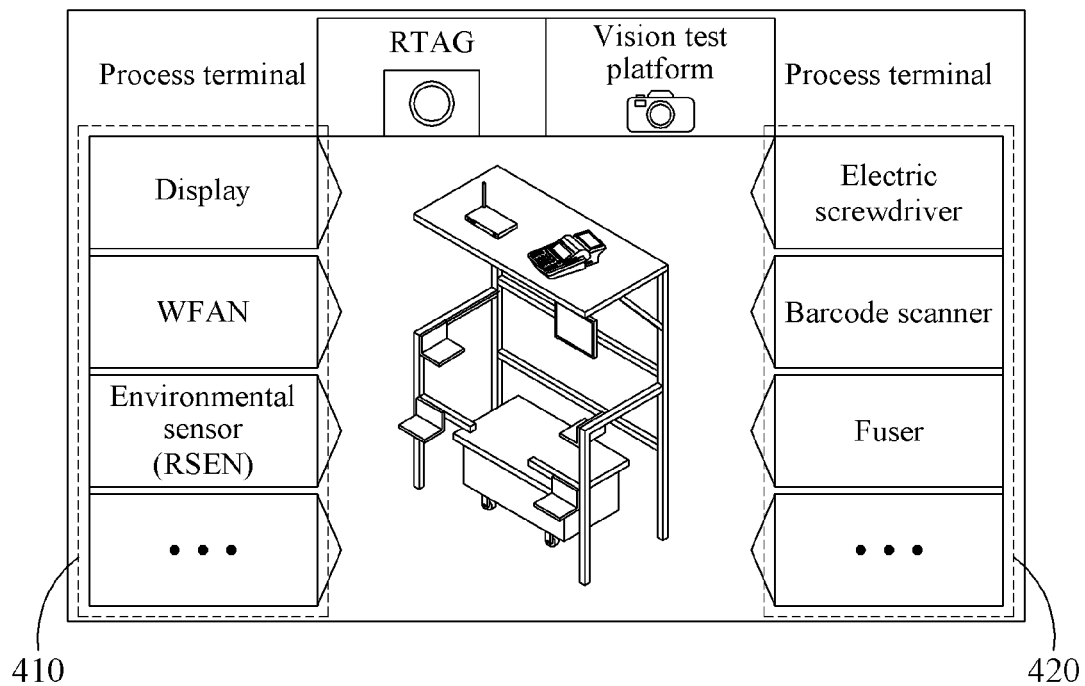
FIG. 4 is a diagram illustrating an example of a process terminal and examples of components according to an example embodiment.

FIG. 4 is a diagram illustrating an example of a process terminal and examples of components according to an example embodiment.

Referring to FIG. 4, the module 311 used in a process line configuration tool includes a list of process terminals 410 and a list of components 420 to be provided in the process terminals 410. The components 420 may be apparatuses or devices that are attachable to or detachable from the process terminals 410, for example, an electric screwdriver, a scanner, and a fuser. In addition, the components 410 to be provided in the process terminals 410 may change by the request of a processor or production line manager.

Figure 5:
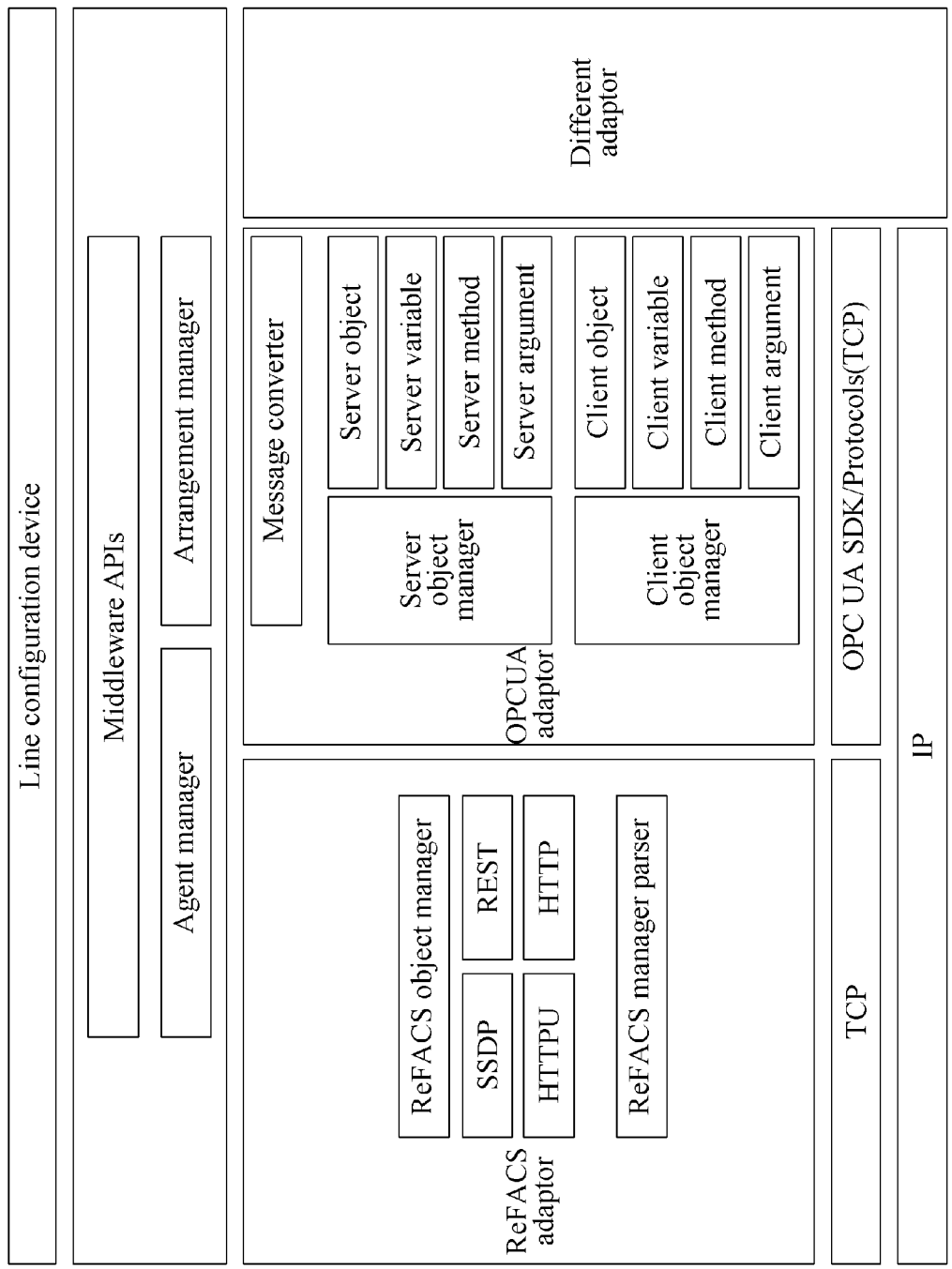
FIG. 5 is a diagram illustrating an example of a middleware included in a line management server and a process terminal according to an example embodiment.

FIG. 5 is a diagram illustrating an example of a middleware included in a line management server and a process terminal according to an example embodiment.

Referring to FIG. 5, the line management server 120 and a processor terminal may include a middleware to transmit and receive information therebetween. Here, a manager may retrieve all agents present in a same network, for example, a flexible assembly system for variable reconfiguration, through broadcasting.

In addition, a ReFACS middleware included in the line management server 120 and the process terminal may process a message protocol between an agent and a manager. In detail, the ReFACS middleware may retrieve a ReFACS middleware of another device connected to the same network using a simple service discovery protocol (SSDP) of a ReFACS interface. The ReFACS middleware may also transmit and receive information with the retrieved ReFACS middleware of another device through representational state transfer (REST) communication.

In addition, the ReFACS middleware may retrieve a ReFACS middleware of another device connected to the same network using a local discovery server (LDS) of an open platform communications unified architecture (OPC-UA) interface. The ReFACS middleware may transmit and receive information with the retrieved ReFACS middleware of another device through OPC-UA communication.

In addition, the ReFACS middleware may also add a new communication method by separating an application programming interface (API). The ReFACS middleware may include a server thread that may receive a SSDP packet for automated configuration, and a thread that may periodically send an advertisement message. Here, the message may include Control, Status, and Event, and the ReFACS middleware may configure an independent routine of processing each message. In addition, the ReFACS middleware may operate one thread for a port of receiving a message, and process a message in each routine based on a message type of a uniform resource identifier (URI).

Figure 6:
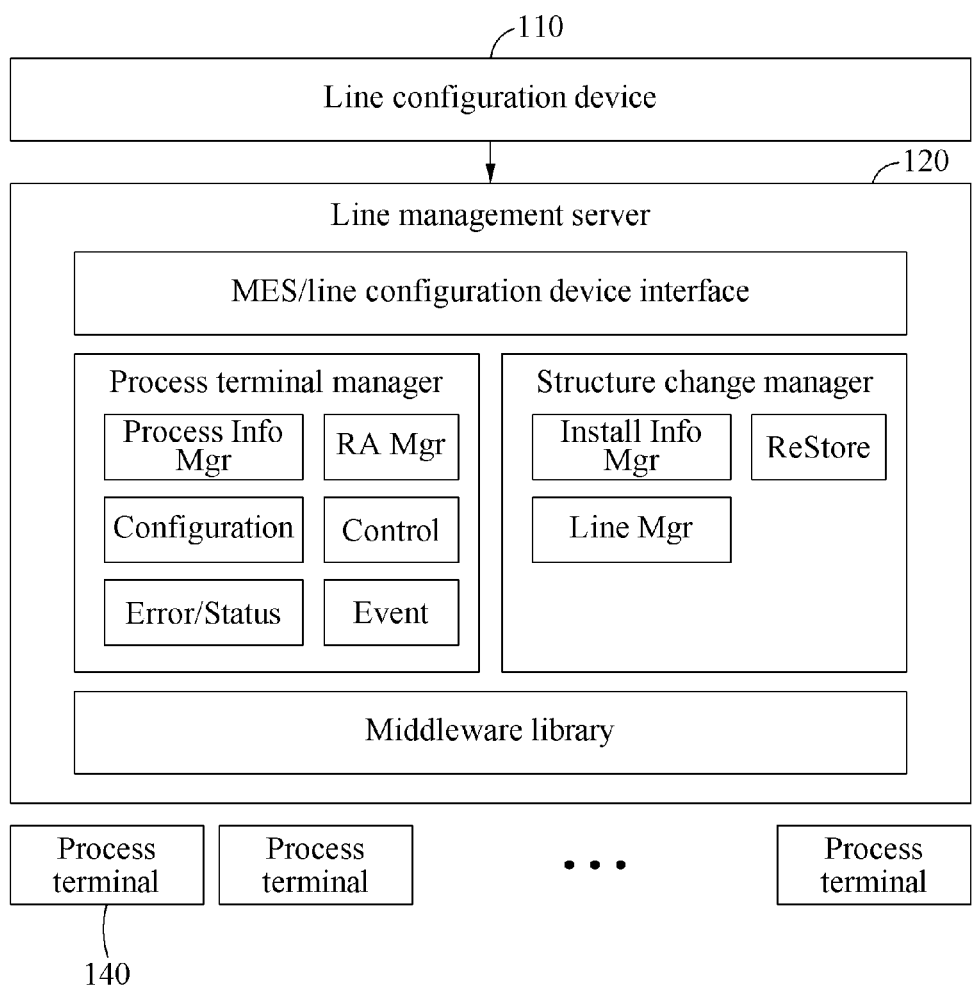
FIG. 6 is a diagram illustrating an example of a structure of a line management server according to an example embodiment.

FIG. 6 is a diagram illustrating an example of a structure of a line management server according to an example embodiment.

Referring to FIG. 6, the line management server 120 may manage the process terminals 140 connected to a same network.

The line management server 120 may transmit a line reconfiguration request to an agent included in each of the process terminals 140 required to be included in a production line reconfigured based on line configuration information received from the line configuration device 110. When the line management server 120 receives a response to the line reconfiguration request from an agent included in each of the process terminals 140, the line management server 120 may determine that a process terminal including an agent transmitting the response is retrieved.

In addition, when all the process terminals 140 to be included in the reconfigured production line are retrieved, the line management server 120 may transmit a message indicating that the reconfiguration of the production line is completed to agents included in the process terminals 140 to be included in the reconfigured production line.

The line management server 120 may also manage a status of each of the process terminals 140 while the production line is operating, and monitor whether an issue or a fault occurs. When an issue or a fault occurs in at least one of the process terminals 140, the line management server 120 may transmit, to a MES, a message indicating that the issue or the fault occurs.

The line management server 120 may include detailed elements as illustrated in FIG. 6.

As illustrated in FIG. 6, 'Process Info Mgr' may manage process information of a component provided in each of the process terminals 140. 'RA Mgr' may manage information and a status of a process terminal. 'Configuration' may manage configuration information of the process terminal.

'Control' may transmit a control message to the process terminal and a component processor of a component. 'Event' may transmit, to the MES, an event transmitted from the process terminal and the component processor.

'Error/Status' may transmit, to the MES, status information transmitted from the process terminal and the component processor. 'Install Info Mgr' may manage an SW version and updating of the component processor.

When an error occurs in the configuration information of the process terminal, 'ReStore' may restore it to an existing status based on the configuration information of the process terminal managed by 'Configuration.' Line Mgr' may manage production line information and reconfigured lines.

Figure 7:
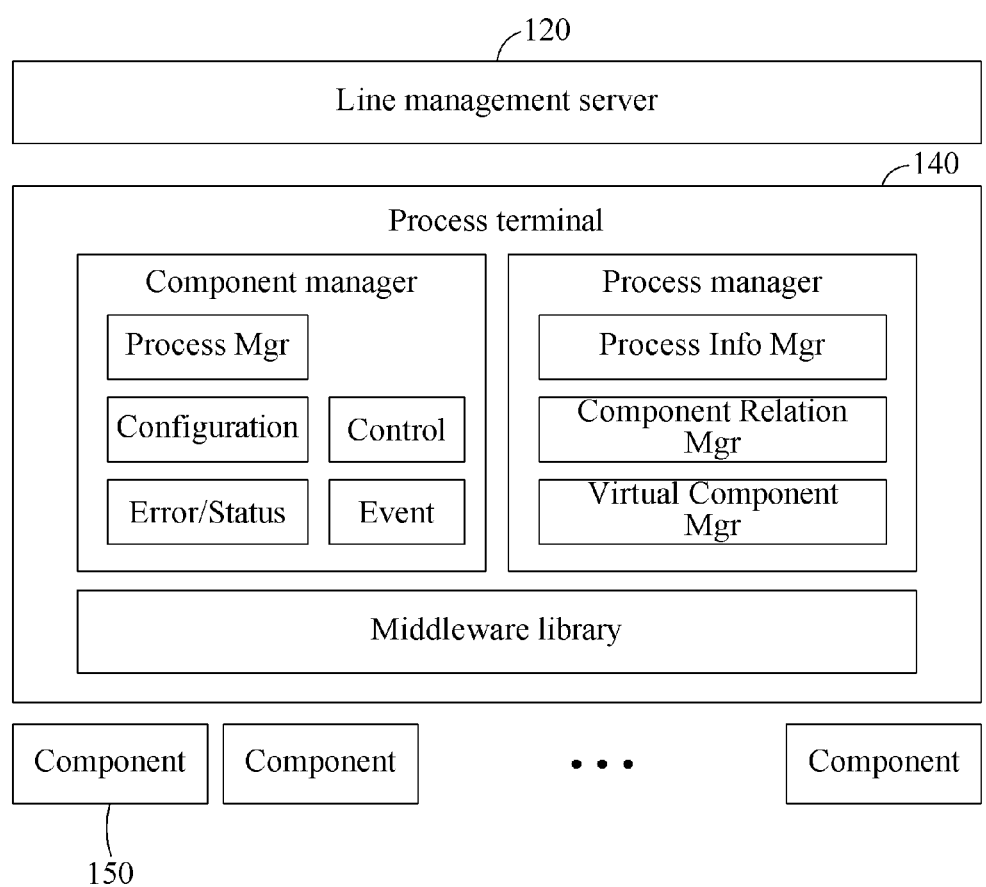
FIG. 7 is a diagram illustrating an example of a structure of a process terminal according to an example embodiment.

FIG. 7 is a diagram illustrating an example of a structure of a process terminal according to an example embodiment.

Referring to FIG. 7, a process terminal may retrieve a component provided in the process terminal by the request of the line management server 120. When reconfiguration of a production line is completed, the process terminal may implement the component provided in the process terminal to initiate or perform production.

While the production line is operating, the process terminal may manage a process of components 150 provided in the process terminal, and monitor whether a fault or an error occurs in a component. When a fault or an error occurs in a component, the process terminal may transmit, to the line management server 120, the fault or the error occurring in the component.

The process terminal may include detailed elements as illustrated in FIG. 7.

As illustrated in FIG. 7, 'Component Mgr' may manage a processor of each of the components 150 provided in the processor terminal. 'Configuration' may manage configuration information of each of the components 150 included in the process terminal. 'Control' may process a control message among the detailed elements.

'Event' may transmit an event message to the line management server 120. 'Error/Status' may transmit, to the line management server 120, a message indicating a status of the process terminal. 'Process Info Mgr' may manage processor information of the components 150 provided in the process terminal.

'Component Relation Mgr' may manage an information exchange relationship among the components 150 provided in the process terminal. Here, 'Component Relation Mgr' may manage a relationship among the components 150 which are attachable to or detachable from the process terminal based on a registered rule. The registered rule may include a rule identification (ID), a status and a condition of a source device to be triggered, and a control command of a target device. For example, the component processor 230 may set the relationship among the components 150 using a rule such as the following code, and manage the relationship.

[Code]

```
<?xml version="1.0" encoding="UTF-8"?>
<ReFACSRule>
    <RuleID>1111111</RuleID>
    <Source>
        <SourceID>22</SourceID>
        <SourceValue>test</SourceValue>
    </Source>
    <Condition>testvalue>20</Condition>
    <Target>
        <TargetID>333</TargetID>
        <ControlData>
            <Name>stop</Name>
            <DataList>
                <Data>
                    <Name>emergencylevel</Name>
                    <Value>5</Value>
                </Data>
            </DataList>
```

```
                </ControlData>
            </Target>
        </ReFACSRule>
```

In detail, the process terminal may receive the relationship information about the relationship among the components 150 in addition to divided line configuration information. 'Component Relation Mgr' may identify a source component and a target component by parsing the received relationship information of the components 150. 'Component Relation Mgr' may then monitor whether a value of the source component satisfies a condition of the rule. When the value of the source component satisfies the condition of the rule, 'Component Relation Mgr' may transmit a message based on the rule to the target component such that the target component may perform a corresponding task.

'Virtual Component Mgr' may manage a virtual component provided in the process terminal.

Figure 8:
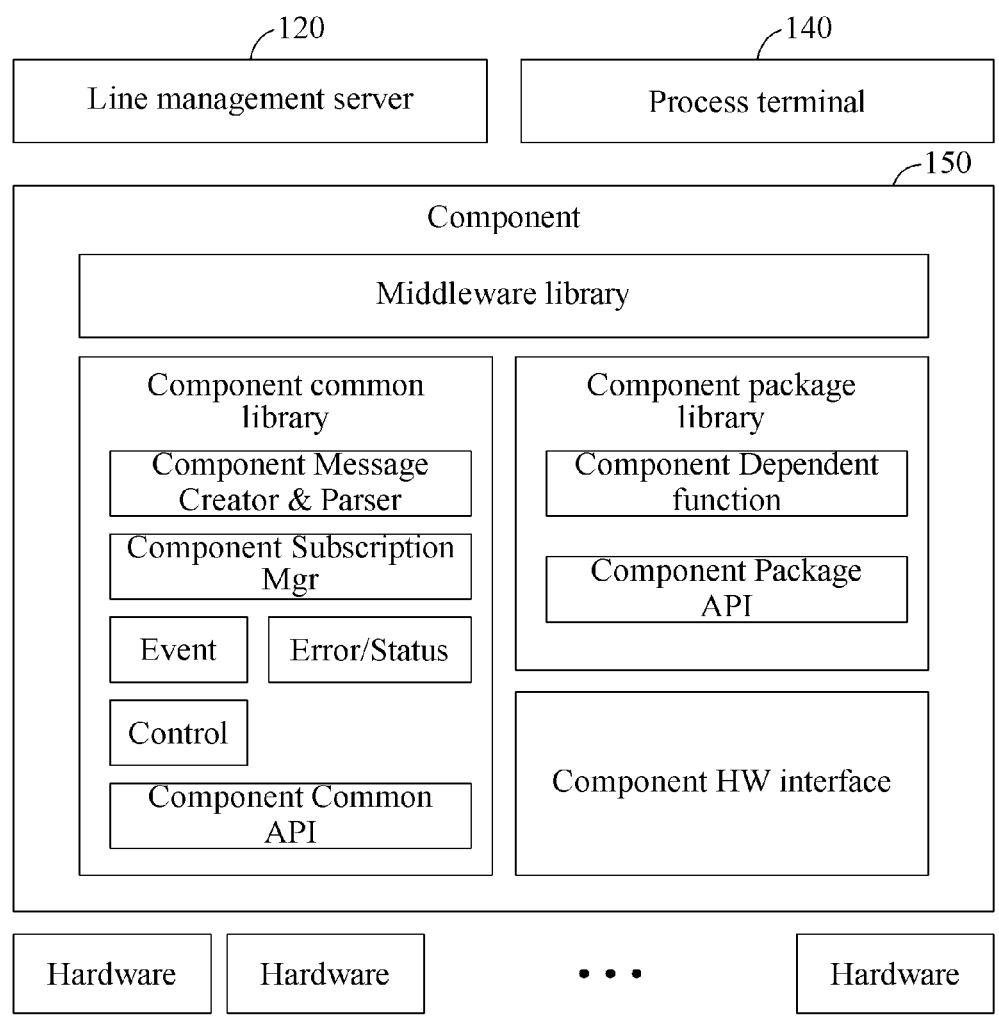
FIG. 8 is a diagram illustrating an example of a structure of a component according to an example embodiment.

FIG. 8 is a diagram illustrating an example of a structure of a component according to an example embodiment.

A component may be designed to maintain an optimal component condition while maintaining software compatibility, using a standardized profile, for example, component package library. In addition, the component may provide an environment in which software compatibility may be maintained permanently through component updating. The component may manage subscription among components, and provide an environment in which information urgently requested or required to be processed in a process may be processed through information exchange among the components.

The component may include detailed elements as illustrated in FIG. 8.

The component may be provided as a packaged component using a middleware library, a component common library, and a component package library.

Herein, the component common library may store and manage commons of components based on a standard, and 'Component Message Creator & Parser may process a message transmitted from the line management server 120, a process terminal, or another component. 'Component Subscription Mgr' may manage an event subscription. 'Control' may process each control message.

'Event' may transmit each event message to the line management server 120. 'Error/Status' may transmit a message indicating a status of the component to the line management server 120. 'Component Common API' may be a library API.

The component package library may group, into a package, components performing a same operation, albeit different interface types, and manage the package.

For example, when the component is embodied as a barcode printer and a component processor in the barcode printer, a type of an interface of a previously used barcode printer and a type of an interface of a barcode printer to be newly used may differ from each other. Here, the component package library may group, into a package, the previously used barcode printer and the barcode printer to be newly used, and manage the package.

Herein, the component dependent function may be a target to be managed by a package for each component type, and the component package API may be a library API.

A component HW interface may be a development environment based on a component development environment based on a hardware configuration, and configured to control an apparatus or device in the package library or receive an event to transmit the received event.

In addition, the component may use an application, a component common library, and a component package library for a hardware interface, for example, USB, RS232, and Bluetooth, and apply components having different interface types as a consistent data model to a system, and thus it is possible to increase reusability of previously used hardware.

Figure 9:
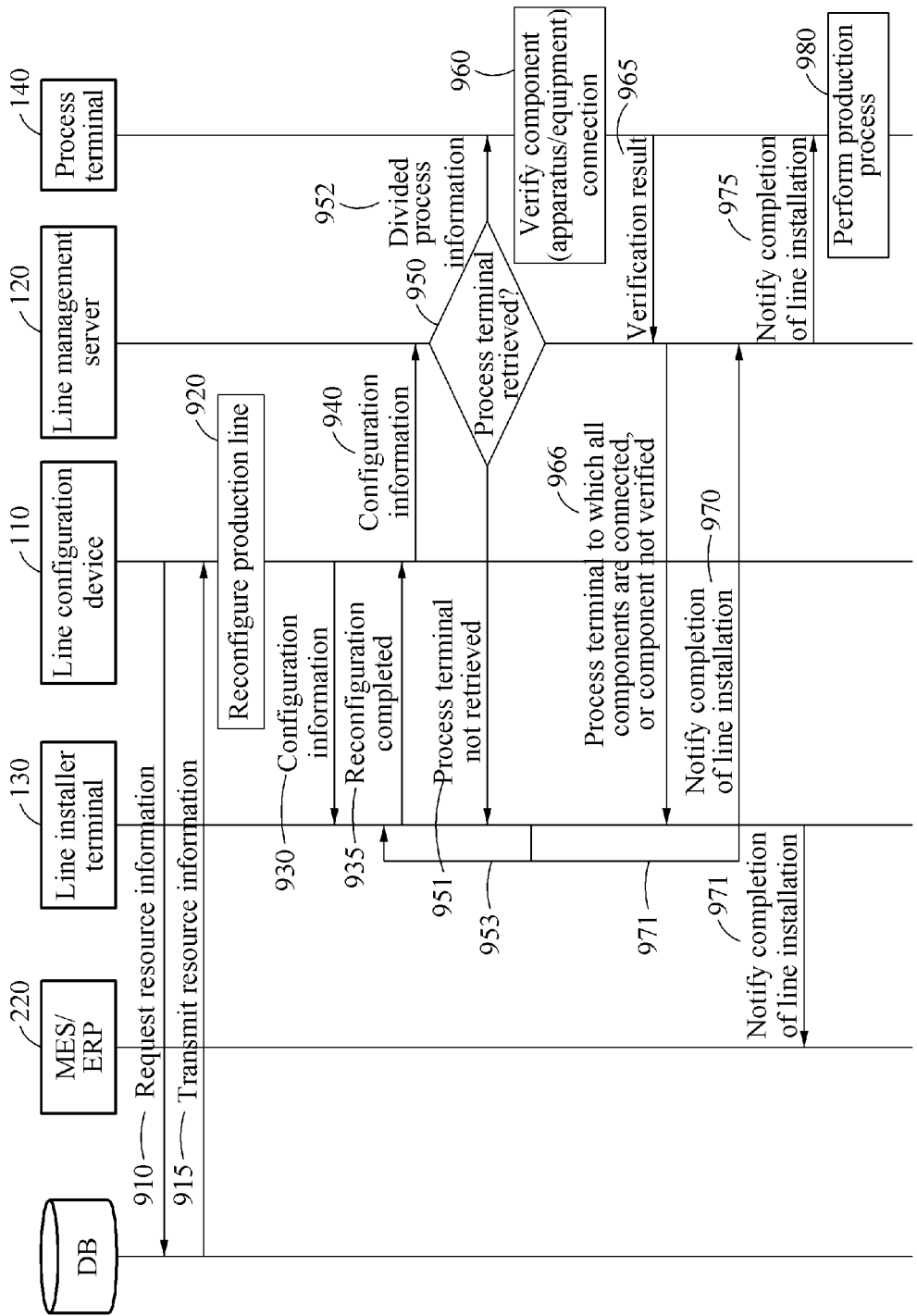
FIG. 9 is a diagram illustrating an example of a method of reconfiguring a production line according to an example embodiment.

FIG. 9 is a diagram illustrating an example of a production line reconfiguring method according to an example embodiment.

Referring to FIG. 9, in operation 910, the line configuration device 110 sends a request to a database (DB) for resource information about resources reusable in a flexible assembly system for variable reconfiguration in order to reconfigure a production line.

In operation 915, the line configuration device 110 receives, from the DB, the resource information requested in operation 910.

In operation 920, the line configuration device 110 provides a process line manager with the resource information received in operation 915. In addition, the line configuration device 110 reconfigures the production line based on an input by the process line manager. Here, the line configuration device 110 generates line configuration information based on the reconfigured production line or process line.

In operation 930, the line configuration device 110 transmits, to the line installer terminal 130, the line configuration information generated in operation 920. Here, the line installer terminal 130 displays the line configuration information to show it to a line installer which installs the production line, and sends a request to the line installer to reconfigure the production line.

In operation 935, the line installer terminal 130 receives information indicating that the reconfiguration of the production line is completed from the line installer which reconfigures the production line based on the line configuration information. Here, the line installer terminal 130 transmits, to the line configuration device 110, a message indicating that the reconfiguration of the production line is completed.

In operation 940, the line configuration device 110 transmits, to the line management server 120, the line configuration information generated in operation 920.

In operation 950, the line management server 120 retrieves process terminals 140 required to be included in the reconfigured production line based on the line configuration information received in operation 940.

When at least one of the process terminals 140 is not retrieved among the process terminals 140 to be included in the reconfigured production line, operation 951 may be performed. When all the process terminals 140 to be included in the reconfigured production line are retrieved, operation 952 may be performed.

In operation 951, the line management server 120 transmits, to the line installer terminal 130, identification information about the process terminal that is not retrieved and a message informing that the process terminal not retrieved is not reconfigured. Here, the line installer terminal 130 displays the identification information about the process terminal not retrieved and send a request for an inspection of the process terminal not retrieved.

In operation 953, when processing the process terminal not retrieved is completed, the line installer terminal 130 receives information indicating that the reconfiguration of the production line is completed from the line installer. Here, the line installer terminal 130 reperforms operation 935.

In operation 951, the line management server 120 divides the line configuration information based on the retrieved process terminals 140. In detail, the line management server 120 may extract, from the line configuration information received in operation 940, a component list of components to be connected to the process terminals 140 retrieved in operation 950, and then divide the line configuration information to correspond to each of the retrieved process terminals 140. In addition, the line management server 120 may transmit the divided line configuration information to each of the retrieved process terminals 140. Here, the line management server 120 may transmit, to a process terminal, a configuration description including a component retrieval method based on serial communication or a characteristic of a component, such that the process terminal may use the configuration description to retrieve a component.

In operation 960, the process terminal retrieves components provided in the process terminals 140 based on component identification information included in the divided line configuration information.

In operation 965, when at least one of the components included in a component list is not retrieved in operation 960, the process terminal transmits, to the line management server 120, identification information of the component not retrieved and a retrieval result including a message indicating that at least one of the components included in the component list is not retrieved. In operation 965, when all the components included in the component list are retrieved, the process terminal transmits, to the line management server 120, a retrieval result indicating that all the components are retrieved. Here, the process terminal may additionally add component connection information about a connection of the retrieved components to the component configuration description, and transmit the component configuration description to which the component connection information is added to the line management server 120. For example, the component connection information may be one of a serial port number or an Ethernet IP.

Here, the line management server 120 may wait for a period of time during which the process terminal is retrieving the components. When the waiting is terminated, the line management server 120 performs operation 966.

In operation 966, the line management server 120 transmits, to the line configuration device 110, information received from the process terminal during the waiting. In addition, the line configuration device 110 transmits, to the line installer terminal 130, the information received from the line management server 120. Here, the line management server 120 may transmit, to the line installer terminal 130, the identification information of the component not retrieved, send a request to the line installer terminal 130 to connect the components included in the component list to the process terminal, or transmit information about the process terminal provided with all the components.

In addition, the line installer terminal 130 may compare the information about the process terminal that is received from the line management server 120 to a list of the process terminals 140 to be included in the reconfigured production line, and verify whether components are all provided in all the process terminals 140 to be included in the reconfigured production line. When all the components are all provided in all the process terminals 140 to be included in the reconfigured production line, the line installer terminal 130 may perform operation 970 to transmit a message informing that installation of the reconfigured production line is completed to the line management server 120. In addition, the line installer terminal 130 may perform operation 972 to transmit a message informing that the installation of the reconfigured production line is completed to the MES/ERP server 220.

When the components are not all provided in all the process terminals 140 to be included in the reconfigured production line, the line installer terminal 130 may display the identification information of the component not retrieved to show it to the line installer, such that the line installer may connect the component corresponding to the identification information to the process terminal. The line installer terminal 130 receives information indicating that the connection of the component is completed from the line installer in operation 971. Then, the line installer terminal 130 reperforms operation 935.

In operation 975, the line management server 120 sends a request to the process terminal to perform a production process.

In operation 980, the process terminal performs the production process by the request received in operation 975 such that the reconfigured production line may operate.

According to example embodiments described herein, it is possible to prevent a process terminal from being omitted in a process of reconfiguring a production line, by retrieving a process terminal needed to be included in the reconfigured production line, and transmitting information about a process terminal not retrieved to a line installer terminal. In addition, it is possible to identify and reuse a component which is reusable in a reconfigured production line among components needed to be connected to process terminals, by transmitting a component list of the components needed to be connected to the process terminals, and verifying, by the process terminals, whether components to be used in the reconfigured production line are provided in the process terminals.

According to example embodiments described herein, it is possible to retrieve a process terminal required to be included in a reconfigured production line, and transmit information about the process terminal not retrieved to a line installer terminal, thereby preventing the process terminal from being omitted in a process of reconfiguring a production line.

According to example embodiments as described herein, it is possible to transmit a component list of components required to be connected to process terminals in a process of reconfiguring a production line and verify whether components to be used in the reconfigured production line are provided using the component list, thereby identifying the components to be used in the reconfigured production line among components provided in the process terminals and reusing the identified components.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of reconfiguring a production line to be performed by a line management server, the method comprising:
    receiving line configuration information based on a reconfigured production line;
    retrieving process terminals required to be included in the reconfigured production line based on the line configuration information;
    when at least one among the process terminals required to be included in the reconfigured production line is not retrieved, transmitting, to a line installer terminal, information about the process terminal not retrieved;
    when all the process terminals required to be included in the reconfigured production line are retrieved, dividing the line configuration information based on each of the retrieved process terminals; and
    transmitting relationship information of components and the divided line configuration information to each of the retrieved process terminals, and verifying whether a component is provided in each of the process terminals,
    wherein the component mounted on the process terminal includes a source component and a target component,
    wherein the process terminal identifies a source component and a target component among mounted components by parsing the relationship information of the components, and
    when a value of the source component satisfies the condition of a rule, the process terminal transmits a message based on the rule to the target component such that the target component may perform a corresponding task,
    wherein the rule includes a rule identification (ID), a status and a condition of a source device to be triggered, and a control command of a target device.

2. The method of claim 1, wherein:
    the line configuration information is generated in a line configuration device and transmitted first to the line installer terminal, and
    when a response that reconfiguration of the production line is completed based on the line configuration information is received from the line installer terminal, the line configuration information is transmitted to the line management server.

3. The method of claim 1, wherein the verifying comprises:
    transmitting the divided line configuration information to each of the retrieved process terminals;
    receiving, from the process terminals, a retrieval result of retrieving components provided in the process terminals based on component identification information included in the divided line configuration information; and
    transmitting the retrieval result to the line installer terminal.

4. The method of claim 3, wherein the transmitting of the retrieval result to the line installer terminal comprises:
    when the retrieval result indicating that at least one component is not retrieved is received, transmitting, to the line installer terminal, identification information of the component not retrieved; and
    when the retrieval result indicating that all components are retrieved is received, transmitting, to the line installer terminal, information about a process terminal in which all components are provided.

5. The method of claim 1, further comprising:
    when components are provided in all the process terminals, sending a request to the process terminals to perform a production process.

6. A method of reconfiguring a production line to be performed by a process terminal in a flexible assembly system capable of variable reconfiguration, the method comprising:
    receiving relationship information of components and a component list including component identification information of components required to be connected to the process terminal;

retrieving a component reusable for a reconfigured production line among components provided in the process terminal based on the component identification information included in the component list;

when there is a component not retrieved among the components included in the component list, transmitting, to a line management server, identification information of the component not retrieved;

when all the components included in the component list are retrieved, transmitting, to the line management server, a retrieval result indicating that all the components are retrieved;

identifying a source component and a target component among mounted components by parsing the relationship information of components; and when a value of the source component satisfies the condition of a rule, transmitting a message based on the rule to the target component such that the target component perform a corresponding task, wherein the rule includes a rule identification (ID), a status and a condition of a source device to be triggered, and a control command of a target device, wherein the line management server is configured to send a request to a line installer terminal to connect the component not retrieved to the process terminal.

7. The method of claim 6, wherein:
the receiving of the component list comprises further receiving a component configuration description based on serial communication or a characteristic of a component, and the retrieving of the component comprises retrieving the component using the component configuration description.

8. A flexible assembly system capable of variable reconfiguration, comprising:
a line management server configured to retrieve process terminals required to be included in a reconfigured production line based on line configuration information of the reconfigured production line, divide the line configuration information based on the retrieved process terminals, and transmit relationship information of components and the divided line configuration information to each of the retrieved process terminals; and a process terminal configured to retrieve a component reusable for the reconfigured production line among components provided in the process terminal based on component identification information included in the divided line configuration information, and transmit a retrieval result of the retrieving to the line management server, wherein the component mounted on the process terminal includes a source component and a target component, wherein the process terminal identifies a source component and a target component among mounted components by parsing the relationship information of components, and when a value of the source component satisfies the condition of a rule, the process terminal is transmitted a message based on the rule to the target component such that the target component perform a corresponding task, wherein the rule includes a rule identification (ID), a status and a condition of a source device to be triggered, and a control command of a target device.

9. The flexible assembly system of claim 8, wherein:
when at least one process terminal is not retrieved among the process terminals to be included in the reconfigured production line, the line management server is configured to transmit, to a line installer terminal, information about the process terminal not retrieved, and when all the process terminals to be included in the reconfigured production line are retrieved, the line management server is configured to divide the line configuration information based on each of the retrieved process terminals.

10. The flexible assembly system of claim 8, wherein:
the line configuration information is generated in a line configuration device and transmitted first to a line installer terminal, and when a response that reconfiguration of a production line is completed based on the line configuration information is received from the line installer terminal, the line configuration information is transmitted to the line management server.

11. The flexible assembly system of claim 8, wherein:
when a retrieval result indicating that at least one component is not retrieved is received from the process terminal, the line management server is configured to transmit, to a line installer terminal, identification information of the component not retrieved, and when a retrieval result indicating all components are retrieved is received from the process terminal, the line management server is configured to transmit, to the line installer terminal, information about the process terminal in which all the components are provided.

12. The flexible assembly system of claim 8, wherein, when components are provided in all process terminals, the line management server is configured to send a request to the process terminals to perform a production process.

13. The flexible assembly system of claim 8, wherein:
when there is a component not retrieved among components included in a component list in the line configuration information, the process terminal is configured to transmit, to the line management server, identification information of the component not retrieved, and when all components included in the component list are retrieved, the process terminal is configured to transmit, to the line management server, a retrieval result indicating that all the components are retrieved.

* * * * *